(12) United States Patent
Federici et al.

(10) Patent No.: US 6,398,497 B1
(45) Date of Patent: Jun. 4, 2002

(54) BLADE LOCK SYSTEM FOR VARIABLE DIAMETER ROTOR SYSTEMS

(75) Inventors: Francis D. Federici, Bridgeport, CT (US); Francis E. Byrnes, White Plains, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/788,822

(22) Filed: Feb. 20, 2001

(51) Int. Cl.[7] .............................................. B64C 11/28
(52) U.S. Cl. ...................................... 416/87; 416/224 R
(58) Field of Search ........................ 416/87, 88, 220 R, 416/226, 244 R

(56) References Cited

U.S. PATENT DOCUMENTS

| | | | |
|---|---|---|---|
| 3,321,020 A | * | 5/1967 | Pfleiderer et al. ............. 416/88 |
| 4,074,952 A | * | 2/1978 | Fradenburgh et al. ........ 416/87 |
| 5,562,416 A | | 10/1996 | Schmaling et al. |
| 5,620,305 A | | 4/1997 | McArdle |
| 5,655,879 A | | 8/1997 | Kiely et al. |
| 6,120,251 A | | 9/2000 | Garcin et al. |

* cited by examiner

Primary Examiner—Edward K. Look
Assistant Examiner—Igor Kershteyn
(74) Attorney, Agent, or Firm—Carlson Gaskey & Olds

(57) ABSTRACT

A VDR blade lock system includes a set of blade pins that are rigidly mounted into the outboard blade section and a set of mount pins that are rigidly mounted to a rotor mount assembly. A resilient bushing at least partially surrounds each pin to provide high-energy absorption, impact resistance and low compressive modules. Should the outboard rotor blade section become free, centrifugal force will cause the outboard rotor blade section to rapidly telescope radially outward over the inboard blade section. The lock system prevents full extension of the outboard rotor blade section while the bushings act as a series of springs to reduce the deceleration rate of the outboard rotor blade section to minimize an impact force experienced by the VDR system.

21 Claims, 4 Drawing Sheets

BLADE LOCK SYSTEM FOR VARIABLE DIAMETER ROTOR SYSTEMS

This invention was made with government support under Contract No.: DABT63-99-3-0002 awarded by the Department of the Army. The government therefore has certain rights in this invention.

BACKGROUND OF THE INVENTION

The present invention provides a lock system for a variable diameter rotor blade system, and more particularly to a lock system which reduces an impact force upon the rotor blade assembly.

A tilt rotor or tilt wing aircraft typically employs a pair of rotor systems which are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller-driven fixed-wing aircraft.

Variable Diameter Rotor (VDR) systems provide distinct advantages. When the plane of the rotor is oriented horizontally, the rotor diameter is enlarged for improved hovering efficiency and, when oriented vertically, the rotor diameter is reduced for improved propulsive efficiency. A VDR blade assembly typically provides an outboard blade segment configured to telescope over a torque tube member. A retraction/extension mechanism is selectively driven to extend and retract the outer blade segment. Controlling the extension and/or retraction of the outboard blade segment relative to the torque tube thereby varies the rotor diameter.

It is known to provide a lock system to provide fail-safe retention of the outboard blade segment to prevent full unintentional extension. However, during unintentional extension of the outboard blade section, the lock system may exert an undesirable impact load upon the rotor blade assembly.

Accordingly, it is desirable to provide a VDR lock system which assures the fail safe retention of the outboard blade section while minimizing negative impact load upon the VDR system.

SUMMARY OF THE INVENTION

A VDR blade system includes a plurality of variable diameter rotor blade assemblies which include an inboard rotor blade section or torque tube and an outboard rotor blade section which telescopes relative to the torque tube. Each VDR blade assembly includes a blade lock system according to the present invention which assures retention of the outboard blade section.

A set of blade pins are rigidly mounted into the outboard blade section and a set of mount pins are rigidly mounted to the mount assembly. A resilient bushing at least partially surrounds each pin to provide high-energy absorption, impact resistance and low compressive modules. An engagement member rotatably extends from each mount pin to selectively engage each respective blade pin to provide fail-safe retention of the outboard blade section.

During VDR rotor system operation, should the outboard rotor blade section become free, centrifugal force will cause the outboard rotor blade section to rapidly telescope radially outward over the torque tube. As the engagement member is aligned with its respective blade pin in the locked position full extension of the outboard rotor blade section will be prevented. The lock system, however, receives an impact force as the outboard blade section is decelerated. The bushings act as a series of springs to reduce the deceleration rate of the outboard rotor blade section. The lock system thus assures the fail safe retention of the outboard blade section while minimizing the impact force experienced by the VDR system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
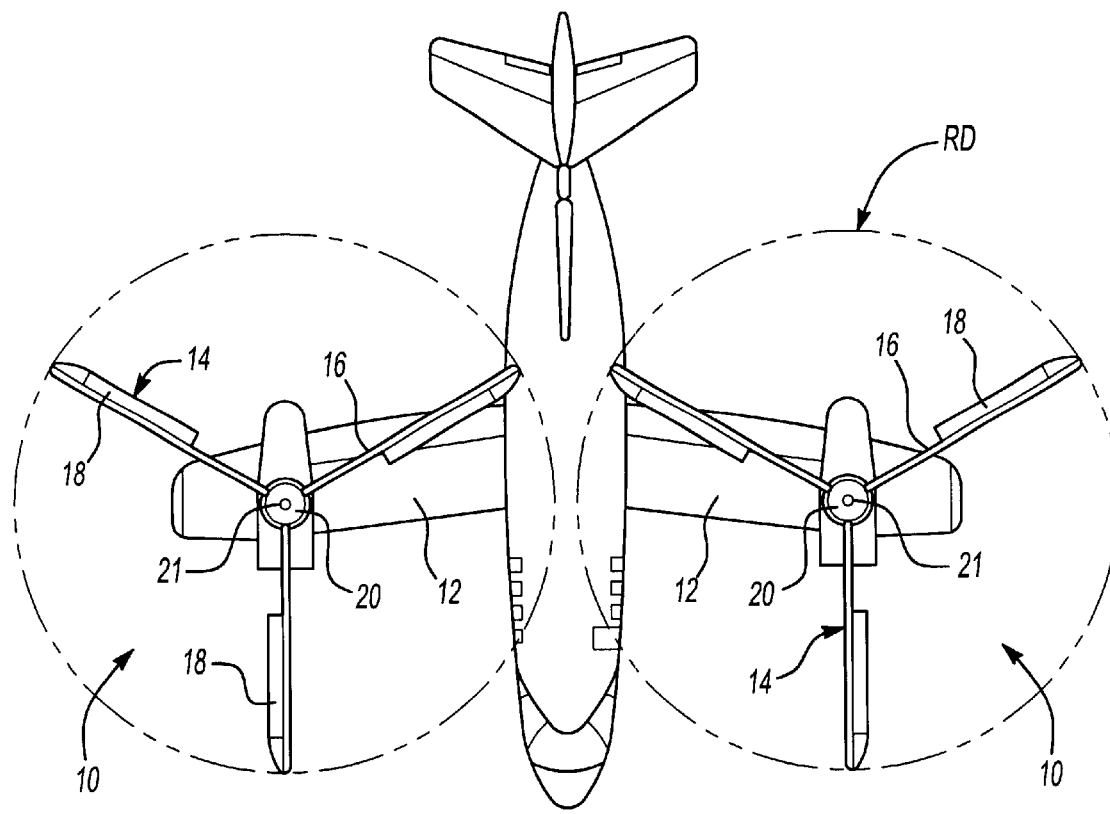
FIG. 1 A is a plan view of a tilt-rotor aircraft illustrating the variable diameter rotor system according to the present invention in its horizontal position.
FIG. 1B is a front view of a tilt-rotor aircraft illustrating the variable diameter rotor system according to the present invention in its vertical position.
Figure 1B:
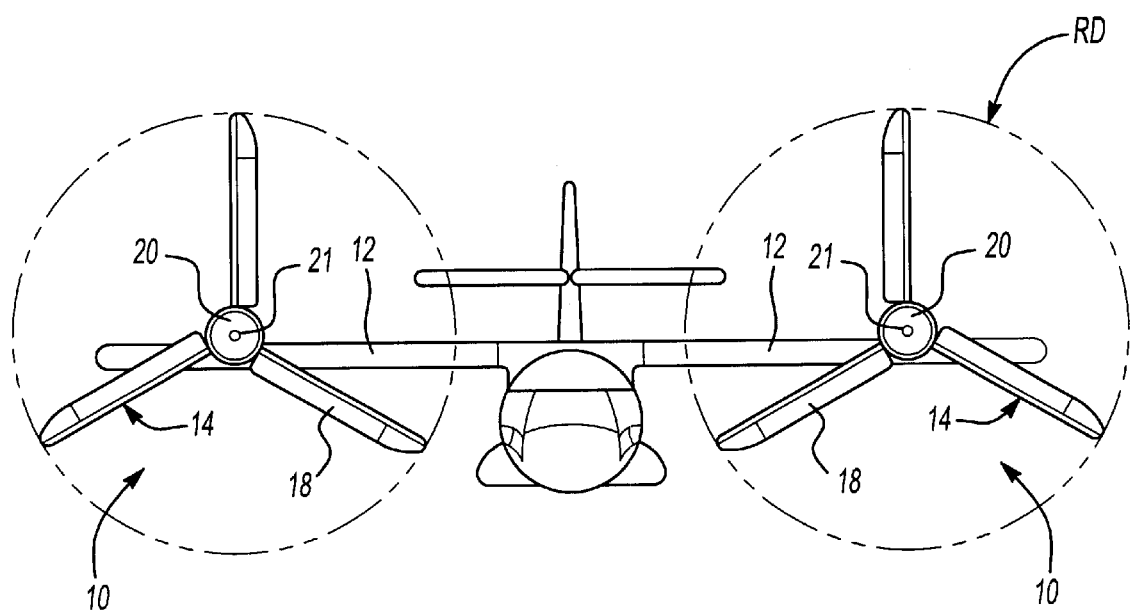

FIG. 1 schematically illustrate a tilt rotor aircraft that includes a pair of variable diameter rotor blade (VDR) systems 10. The VDR systems 10 are shown pivotally mounted on laterally extending wing sections 12 of an aircraft. The VDR systems 10 are pivotable between a horizontal or hover flight position, shown in FIG. 1A, and a vertical or forward flight position, shown in FIG. 1B.

Each VDR system 10 includes a plurality of variable diameter rotor blade assemblies 14 which are capable of being extended and retracted to vary the size of the rotor diameter (RD) as required. In order to effectuate the change in diameter, the VDR blade assemblies 14 include an inboard rotor blade section 16 and an outboard rotor blade section 18 which telescopes relative to the inboard rotor blade section 16. The VDR blade assembly 14 is mounted to and driven by a rotor hub assembly 20 about an axis of rotation 21.

Figure 2A:
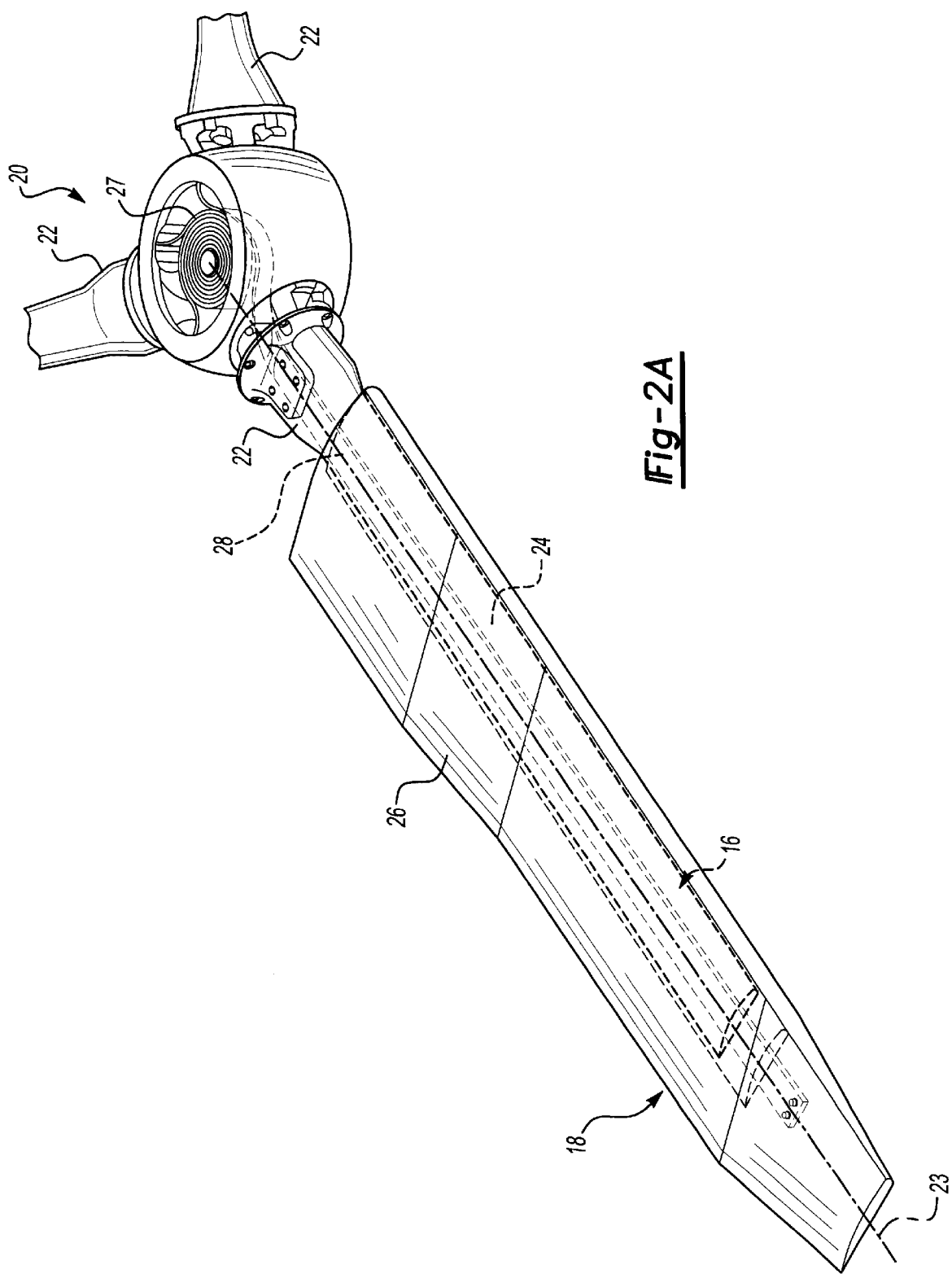
FIG. 2A is an expanded view of a VDR blade assembly.

Referring to FIG. 2A, each VDR blade assembly 14 includes the movable outboard rotor blade section 18 which telescopes over the inboard rotor blade section 16 (hereinafter referred to as a torque tube 16) along a longitudinal axis 23. A blade mount assembly (illustrated somewhat schematically at 22) mounts the torque tube 16 to the rotor hub assembly 20 to allow pitch change relative thereto. The outboard rotor blade section 18 includes a hollow spar member 24 which is enveloped by a blade 26 to define the requisite aerodynamic contour of the outboard rotor blade section 18.

The outboard rotor blade section 18 is telescopically retractable and extendable relative to the torque tube 16 by a reeling assembly 27 mounted within the rotor hub assembly 20. A retraction/extension mechanism (not shown) is selectively driven to selectively rotate the reeling assembly 27 to wind/unwind a drive strap 28 or the like which is attached to the outboard blade section 18. Controlling the extension and/or retraction of the drive strap 28 controls the outboard blade segment 18 relative to the torque tube 16 and thereby varies the rotor diameter.

Figure 2B:
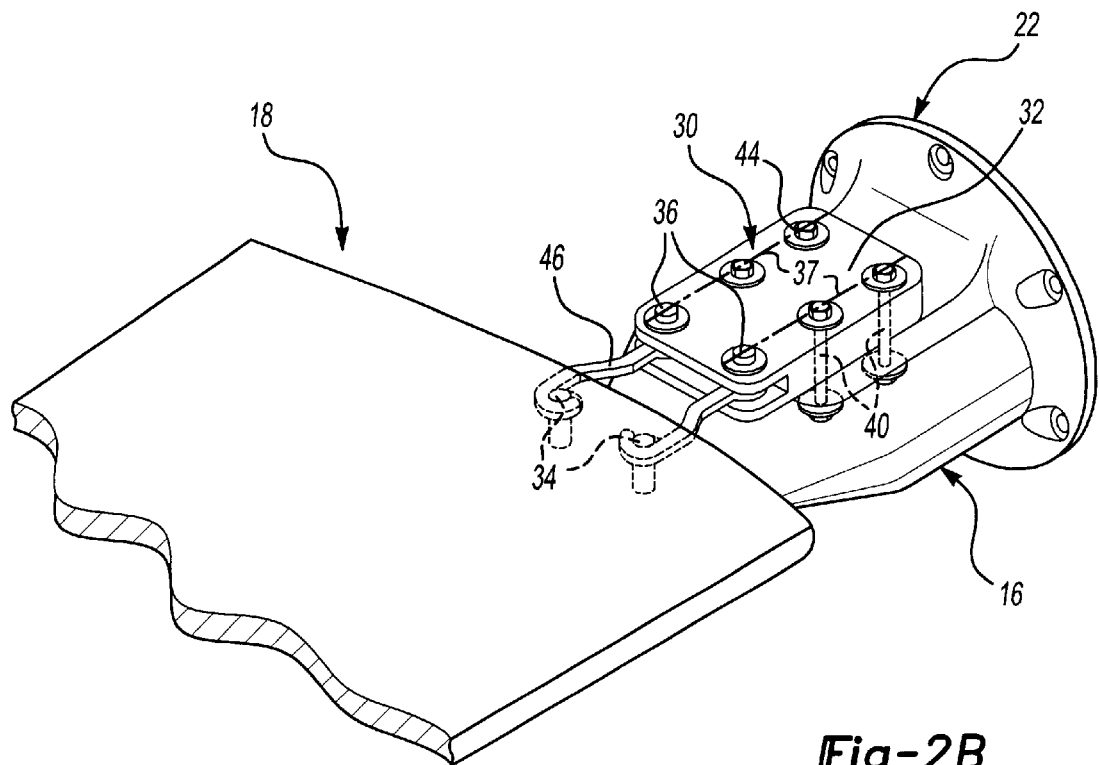
FIG. 2B is an expanded view of the VDR bade assembly of FIG. 2A having a locking system according to the present invention.

Referring to FIG. 2B, the blade mount assembly 22 preferably includes a blade lock system 30 which assures retention of the outboard blade section 18. Although only a single lock system is illustrated and described, it should be understood that each VDR blade assembly may include a plurality of lock systems.

A set of blade pins 34 are rigidly mounted into the outboard blade section 18 and a set of mount pins 36 are rigidly mounted to the blade mount assembly 22. Each blade pin 34 and it associated mount pin 36 are aligned along a pin axis 37 defined substantially parallel to the longitudinal axis 23.

Figure 2C:
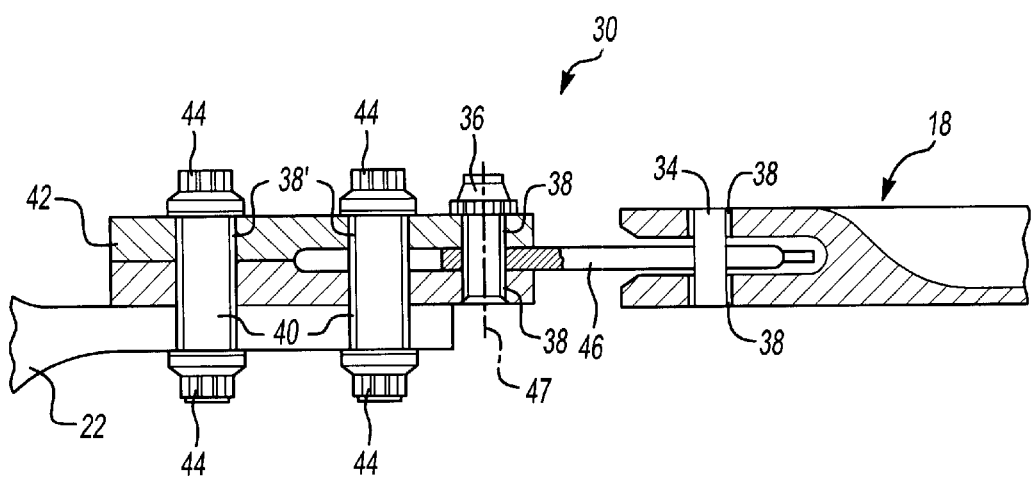
FIG. 2C is a sectional view of the blade locking system of FIG. 2B taken along a longitudinal axis of the VDR blade assembly.

Referring to FIG. 2C, a resilient bushing 38 (FIG. 3A) at least partially surrounds each pin 34,36. The bushings 38 are preferably located between the pin 34, 36 and the component to which the pin 34,36 is mounted, i.e., a blade bushing 38 is located between blade pin 34 and outboard blade segment 18; and a mount bushing 38 is located between the mount pin 36 and lock plates 42. It should be realized that alternatively or additionally, bushings 38' are located to entirely surround lock pins 40 which mount the lock plates 42 of the lock assembly 30 to the blade mount assembly 22. Fasteners, such as nuts 44 or the like, retain lock pins 40 in the lock plates 42 of the lock assembly 30. The lock assembly 30 is thereby rigidly retained to the blade mount assembly 22. It should be understood that other fastener arrangements may additionally or alternatively be provided.

The bushings 38 are preferably formed of a toughened nylon thermoplastic polyamide such as Zytel®, which is manufactured by E.I. du Pont de Nemours and Company, 1007 Market Street, Wilmington, Del. 19898, USA. The bushing material is preferably selected to provide high-energy absorption, impact resistance and low compressive modules. Most preferably, the material is selected to provide a low radial spring rate.

An engagement member 46 rotatably extends from each mount pin 36 to selectively engage each blade pin 34 to provide fail-safe retention of the outboard blade section 18. Preferably, a terminal portion 48 such as a hook-like segment of each engagement member 46 is engageable with each blade pin 34. Bushings 38 may alternatively surrounds either or both pins 34,36 in the manner of pins 40, such that the engagement member 40 directly rotates about and engages the bushing 38'.

Figure 2D:
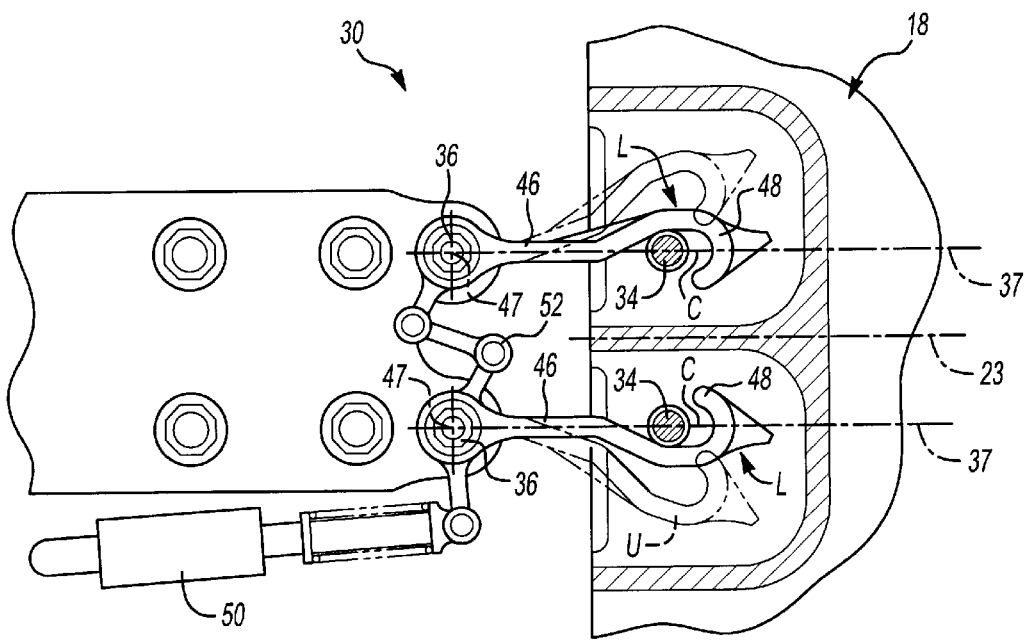
FIG. 2D is a top, partially sectional view of the blade locking system of FIG. 2B.

Referring to FIG. 2D, a lock drive system (illustrated schematically at 50) selectively rotates each engagement member 46 about an axis 47 defined by each mount pin 36. A link 52 preferably connects each engagement member 46 such that the engagement members 46 move substantially in concert. In an unlocked position (illustrated in phantom at U), each engagement member 46 is rotated about its mount pin 36 such that the terminal portion 48 clears its respective blade pin 34. In other words, the engagement member 46 is rotated away from axis 37. The outboard blade section 18 is thereby free to be extended.

In a locked position (illustrated at L), each engagement member 46 is rotated about its mount pin 36 by the lock drive system 50 and link 52 such that the terminal portion 48 of each engagement member 46 is aligned with its respective blade pin 34. In other words, the engagement member 46 is oriented along axis 37. It should be understood that the terminal portion 48 is not in direct contact with its blade pin 34 when the lock system 30 is in the lock position. A clearance C is preferably provided to assist in actuation of the lock system 30 and minimize vibration transfer.

During VDR rotor system operation, should the outboard rotor blade section 18 become free from the drive strap 28 (FIG. 2A), centrifugal force will cause the outboard rotor blade section 18 to rapidly telescope radially outward over the torque tube 16. As the terminal portion 48 is aligned with its respective blade pin 34 in the locked position L, the terminal portion 48 will engage its respective blade pin 34 to prevent full extension of the outboard rotor blade section 18. The lock system 30 thereby receives an impact force as the outboard blade section 18 is decelerated by the engagement member 46.

Figure 3:
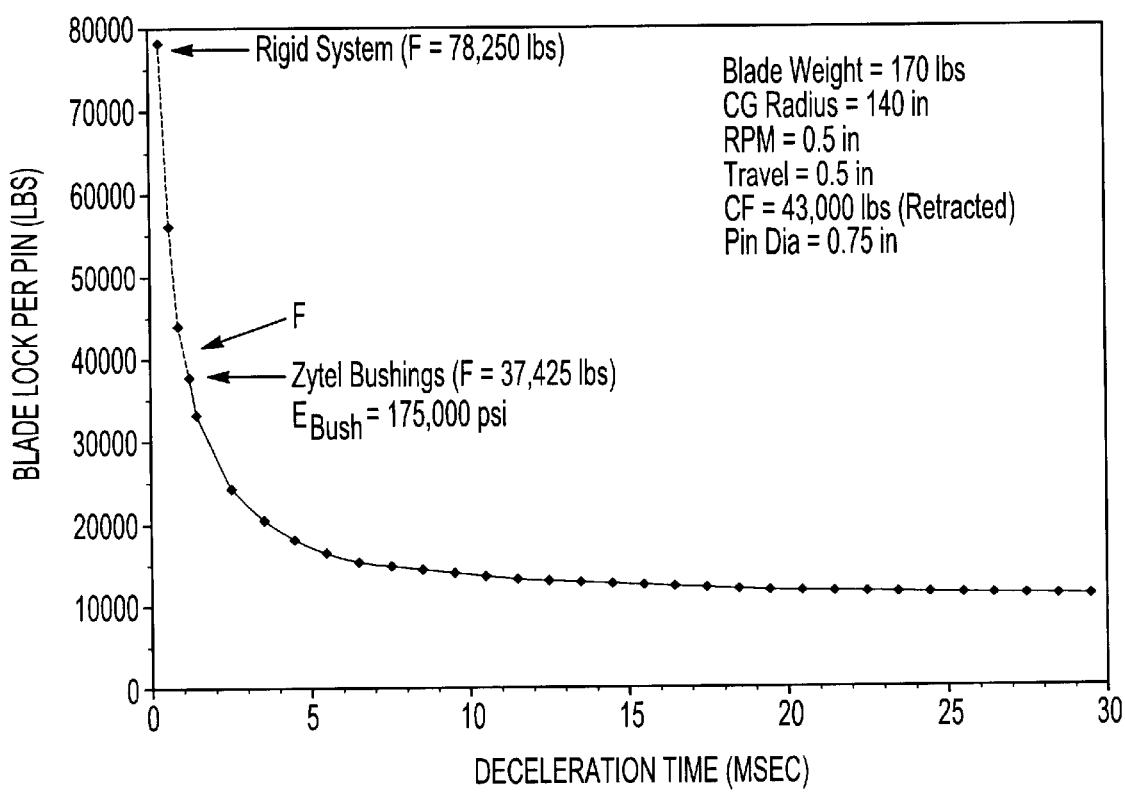
FIG. 3 is a graphical representation of an impact force F on each pin of the blade locking system according to the present invention should the outboard rotor blade section become free to rapidly telescope radially outward.

Referring to FIG. 3, a graphical representation of the impact force F on each pin is illustrated. The bushings 38 act as a series of springs to reduce the deceleration rate of the outboard-rotorblade section 18. As the outboard-rotorblade section 18 is decelerated by the lock system 30, the bushings 38 reduce the deceleration rate and the maximum impact force F by more than one-half a rigid system.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A blade lock system for a variable diameter rotor system having a rotor hub assembly and a multiple of rotor blade assemblies, each of said rotor blade assemblies having an outboard blade section telescopically mounted to an inboard blade section, said inboard blade section mounted to said rotor hub assembly through a blade mount assembly, said blade lock system comprising:

a blade pin attached to the outboard blade section, said blade pin at least partially surrounded by a blade pin bushing;

a mount pin attached to the blade mount assembly, said mount pin at least partially surrounded by a mount pin bushing; and an engagement member rotatably mounted about said mount pin, said engagement member movable between a locked position aligned with said blade pin and an unlocked position clear of said blade pin.

2. The blade lock system according to claim 1, wherein said blade pin bushing and said mount pin bushing are manufactured of a toughened nylon.

3. The blade lock system according to claim 1, wherein said blade pin bushing and said mount pin bushings are manufactured of toughened nylon thermoplastic polyamide.

4. The blade lock system according to claim 1, wherein said blade pin bushing is located between said blade pin and the outboard blade section, and said mount pin bushing is located between said mount pin and the blade mount assembly.

5. The blade lock system according to claim 1, wherein said mount pin is surrounded by said mount pin bushing, said engagement member rotatably mounted about said mount pin bushing.

6. The blade lock system according to claim 4, wherein said blade pin is surrounded by said blade pin bushing.

7. The blade lock system according to claim 1, wherein each rotor blade assembly defines a longitudinal axis, said blade pin and said mount pin aligned along an axis substantially parallel with said longitudinal axis.

8. The blade lock system according to claim 1, further including a lock drive system to selectively rotate said engagement member between said locked position and said unlocked position.

9. The blade lock system according to claim 1, wherein a clearance is formed between said engagement member and said blade pin when in said locked position.

10. A variable diameter rotor system, comprising:
    an outboard blade section telescopically mounted to an inboard blade section;
    a blade mount assembly rotatably mounting said inboard blade section to a rotor hub assembly;
    a blade lock system attached to said blade mount assembly;
    a blade pin attached to the outboard blade section, said blade pin being at least partially surrounded by a blade pin bushing;
    a mount pin attached to said blade lock system, said mount pin at least partially surrounded by a mount pin bushing; and
    an engagement member rotatably mounted about said mount pin, said engagement member movable between a locked position aligned with said blade pin and an unlocked position clear of said blade pins.

11. The blade lock system according to claim 10, wherein said blade pin bushing and said mount pin bushing are manufactured of a toughened nylon.

12. The blade lock system according to claim 10, wherein said blade pin bushing and said mount pin bushing are manufactured of toughened nylon thermoplastic polyamide.

13. The blade lock system according to claim 10, further including a terminal member extending from said engagement member, said terminal member engageable with said blade pin.

14. The blade lock system according to claim 10, further including a terminal member extending from said engagement member, said terminal member engageable with said blade pin bushing.

15. The blade lock system according to claim 10, wherein each rotor blade assembly defines a longitudinal axis, said blade pin and said mount pin aligned about an axis substantially parallel with said longitudinal axis.

16. The blade lock system according to claim 10, further including a lock drive system to selectively rotate said engagement member between said locked position and said unlocked position.

17. The blade lock system according to claim 10, wherein a clearance is formed between said engagement member and said blade pin when in said locked position.

18. A variable diameter rotor system, comprising:
    an outboard blade section telescopically mounted to an inboard blade section;
    a blade mount assembly rotatably mounting said inboard blade section to a rotor hub assembly;
    a blade lock system attached to said blade mount assembly;
    a blade pin attached to the outboard blade section, said blade pin being at least partially surrounded by a blade pin bushing;
    a mount pin attached to said blade lock system, said mount pin at least partially surrounding by a mount pin bushing;
    an engagement member rotatably mounted about said mount pin, said engagement member movable between a locked position aligned with said blade pin and an unlocked position clear of said blade pin;
    a lock drive system to selectively rotate said engagement member between said locked position and said unlocked position; and
    a terminal member extending from said engagement member, said terminal member engageable with said blade pin when in said locked position.

19. The blade lock system according to claim 18, wherein each rotor blade assembly defines a longitudinal axis, said blade pin and said mount pin aligned about an axis substantially parallel with said longitudinal axis.

20. The blade lock system according to claim 18, further including a terminal member extending from said engagement member, said terminal member engageable with said blade pin.

21. The blade lock system according to claim 18, further including a terminal member extending from said engagement member, said terminal member engageable with said blade pin bushing.

* * * * *